United States Patent [19]

Banks

[11] Patent Number: 5,796,376
[45] Date of Patent: Aug. 18, 1998

[54] ELECTRONIC DISPLAY SIGN

[75] Inventor: Archie A. Banks, Prince Edward Island, Canada

[73] Assignee: CIE Research, Inc., Prince Edward Island, Canada

[21] Appl. No.: 422,701

[22] Filed: Apr. 14, 1995

Related U.S. Application Data

[63] Continuation of Ser. No. 406,660, Mar. 20, 1995, abandoned, which is a continuation of Ser. No. 149,714, Nov. 9, 1993, abandoned, which is a continuation of Ser. No. 809,670, Dec. 18, 1991, abandoned.

[51] Int. Cl.$^6$ .............. B41J 2/105; B41J 2/01; B41J 3/00; B41J 29/38
[52] U.S. Cl. .............. 345/82; 345/1; 345/4; 345/903
[58] Field of Search .............. 345/82, 1, 2, 4–6, 345/903; B41J 2/105, 2/01, 3/00, 29/56

[56] References Cited

U.S. PATENT DOCUMENTS

| | | |
|---|---|---|
| 3,811,071 | 5/1974 | Ogle . |
| 4,006,476 | 2/1977 | Rommey . |
| 4,384,279 | 5/1983 | Fujita . |
| 4,445,132 | 4/1984 | Ichikawa et al. . |
| 4,581,612 | 4/1986 | Jones . |
| 4,745,404 | 5/1988 | Kallenberg . |
| 4,771,278 | 9/1988 | Pooley . |
| 4,825,201 | 4/1989 | Watanabe et al. . |
| 4,833,542 | 5/1989 | Hara et al. . |
| 4,897,651 | 1/1990 | DeMonte . |
| 4,901,155 | 2/1990 | Hara et al. . |
| 5,079,636 | 1/1992 | Brody . |
| 5,136,695 | 8/1992 | Goldshlag et al. . |

FOREIGN PATENT DOCUMENTS

| | | |
|---|---|---|
| 0242742 | 10/1987 | European Pat. Off. . |
| 0247377 | 12/1987 | European Pat. Off. . |
| 3513607 | 10/1986 | Germany . |

Primary Examiner—Mark R. Powell
Assistant Examiner—Vivek Srivastava
Attorney, Agent, or Firm—Andrus, Sceales, Starke & Sawall

[57] ABSTRACT

An electronic display sign constructed around a system bus architecture is disclosed. The electronic display sign is preferably a modular construction wherein a number of modules are connected together to form a large display sign which is capable of displaying images at rates which exceed thirty frames a second. Display data is formatted and transmitted to display modules by a sign controller which resides on one of the panels. Each display panel is preferably provided with its own power source.

30 Claims, 7 Drawing Sheets

ELECTRONIC DISPLAY SIGN

This application is a continuation of Ser. No. 08/406,660, filed Mar. 20, 1995, now abandoned which was a file wrapper continuation of Ser. No. 08/149,714, filed Nov. 9, 1993, which was a file wrapper continuation of Ser. No. 07/809,670, filed Dec. 18, 1991, now abandoned.

The present invention relates to electronic display signs and in particular to a novel modular electronic display sign which may include one or more display panels that are connected to a sign controller by a system bus.

BACKGROUND OF THE INVENTION

Electronic display signs of a type which display images or text messages as points of light arewell known in the art. Such signs are commonly seen in public places. Display signs of this type generally use LEDs (light emitting diodes) as light sources because of their long term reliability and low power consumption.

Normally electronic display signs comprise a panel of light sources arranged in a matrix pattern of rows and columns. Such signs are usually relatively small but large signs having a dimension of at least 10 feet (3.3 meters) per side are sometimes constructed. Because of their size and complexity large display signs are difficult and expensive to construct. The construction of large display signs also presents special design problems because of their power consumption requirements since illuminating a large number of independent light sources requires a considerable electric power supply and robust switching equipment. Traditionally, large display signs have been constructed around an electric circuit which includes shift registers for powering on selected light sources in rapid succession in order to minimize the power consumption and power switching requirements of the sign. There are some disadvantages to using shift register circuits in such applications, however. First, signs built with shift register circuits are relatively slow and only genuinely effective for displaying scrolling, flashing or static character data. True animation and/or a simultaneous full power on of each LED in the matrix are not possible. Signs powered by shift registers are therefore limited in their ability to display images for visual effect.

In order to facilitate the assembly, transport and installation of large display signs, it is desirable to design such signs as modular units which may be interconnected to form a sign of a desired modular dimension. Modular display signs are known. German patent 35 13 607 which issued to Lumino Licht Elektronik GmbH on Oct. 23, 1986, discloses a modular sign (shown in FIG. 1 of that patent) which comprises a plurality of display panels that may be interconnected in juxtaposition to form a sign of a larger modular dimension.

European patent application no. 0 247 377 which was filed by Lumino Licht Electronik GmbH and published on Oct. 11, 1989, describes a circuit board used for interconnecting LEDs in a matrix pattern for use in a modular display sign.

European patent application no. 0 242 742, was also filed by Lumino Licht Elektronik GmbH and published on Aug. 30, 1989. This patent application is entitled (in English translation) Circuit Arrangement for Selectively Controlling Function Modules by a Bus-System. The patent describes an electronic display sign architecture wherein microprocessors associated with "function modules" are signalled and controlled by timed voltage drops on an electronic bus effected by switching XY coordinates of a voltage grid which powers the display sign. Although this architecture appears to permit the construction of a sign which yields an improved performance over the more traditional shift register circuit, it is nonetheless a complicated system which requires the switching of substantial amounts of power. Advances in LED technology have made electronic display signs more attractive because new high intensity red LEDS which are now widely available from a number of suppliers output at least fifteen candellas of light energy. Signs constructed with these new LEDS are clearly visible in daylight conditions permitting outside installations of display signs which are effective at any time of day. The currently available sign technology is not very conducive to the exploitation of the improved power of LEDS because the lack of speed and flexibility of the display sign does not permit very innovative use of such signs as advertising tools. There therefore exists a need for a fast, powerful electronic display sign architecture which permits the innovative use of electronic display signs as an entertaining advertising medium.

SUMMARY OF THE INVENTION

It is an object of the present invention to provide an electronic display sign having a system bus architecture to accommodate the high speed transfer of display and control data over relatively long distances.

It is a further object of the present invention to provide an electronic display sign wherein at least one display panel is controlled by a sign controller which transmits data signals over a system bus in order to effect and control the display of an image on the at least one display panel.

It is a further object of the invention to provide a large modular electronic display sign which can be manufactured and supplied at reasonable cost.

It is yet a further object of the invention to provide an electronic display sign which is capable of full video animation.

It is yet a further object of the invention to provide an electronic display sign of a modular design, each module having local display, local refresh, and local control capabilities.

It is a further object of the invention to provide an electronic display sign of a modular design wherein each module may be adjusted for steradiance matching in the event that a module requires replacement and a replacement module from the same LED production batch as the original sign cannot be obtained.

In accordance with the present invention there is provided an electronic display sign which comprises at least one display node having a display surface which supports a plurality of light sources for displaying images as discrete points of light;

at least one control node for controlling the display of images by the at least one display node using addressed data signals and control signals;

and at least one sign system bus for transferring the addressed data signals and control signals from the at least one control node to the at least one display node.

The electronic display sign in accordance with the invention is preferably constructed in accordance with a modular design whereby one or more display panels are interconnected in a juxtaposed relationship to yield a sign having a desired dimension. Each display sign is provided with at least one sign controller which operates a control program to format and aportion data representative of that portion of an image to be displayed by each display panel. Each display panel is connected to the sign controller by a sign system bus which is used for the transmission of addressed display and control signals. Each display panel is provided with its own power supply which drives the LEDs on the display panel. This permits the use of fast, efficient electric switching components that permit a multiplexed power scheme in which only a portion of the LEDs on each panel are driven at any point in time but the multiplexed power frequency is so rapid that all LEDs on a panel appear to be continuously lit, if desired. The multiplex scheme greatly reduces the number of individual LED drivers required and therefore reduces the cost of each panel.

The present invention therefore provides an electronic display sign of a modular design which permits a user to select a sign of an appropriate size with the understanding that the size of the sign may be enlarged as need or funds permit. The invention also provides the capability of a large scale electronic display sign which is capable of full video animation at display rates well in excess of thirty frames/second.

BRIEF DESCRIPTION OF THE DRAWINGS

A preferred embodiment of the present invention will now be explained by way of example only and with reference to the following drawings, wherein.

DETAILED DESCRIPTION OF A PREFERRED EMBODIMENT

Figure 1:
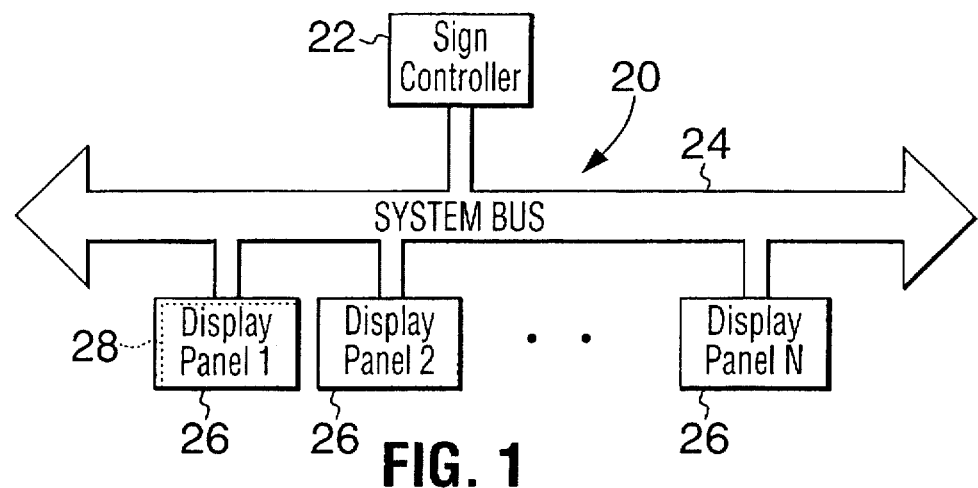
FIG. 1 is a block diagram of the architecture of an electronic display sign in accordance with the invention.

FIG. 1 shows a block diagram of the design concept of an electronic display sign, generally referred to by reference numeral 20, in accordance with the invention. In its simplest form, an electronic display sign in accordance with the invention includes a sign controller 22, a sign system bus 24, and a display panel 26. In accordance with the preferred embodiment of the invention, the display panel 26 has a display surface which supports 512 light sources arranged in 16 rows of 32 columns. Each light source 28 is preferably a light emitting diode (LED). The preferred LED is a high intensity red LED which outputs at least 15 candellas of light energy. Such LEDs are available from a number of suppliers. An electronic sign in accordance with the invention may include as many as 128 display panels 26 which yields a display sign that is approximately 13 feet 4 inches (approximately 4.3 m) square. A sign of this size has a total of 65,536 (64K) light elements. Much larger and much smaller signs can, of course, be built in accordance with the sign system architecture taught hereinafter. Those skilled in the art will recognize that the limit of the size of the preferred embodiment is due to hardware and software limitations which are minor in nature and readily overcome. Theoretically, using multiple sign controllers 22 and a plurality of sign system buses 24, the size of the display sign 20 is unlimited. Nonetheless, for practical purposes, a display surface of 13 feet 4 inches square is considered to be adequate for most applications.

Figure 2:
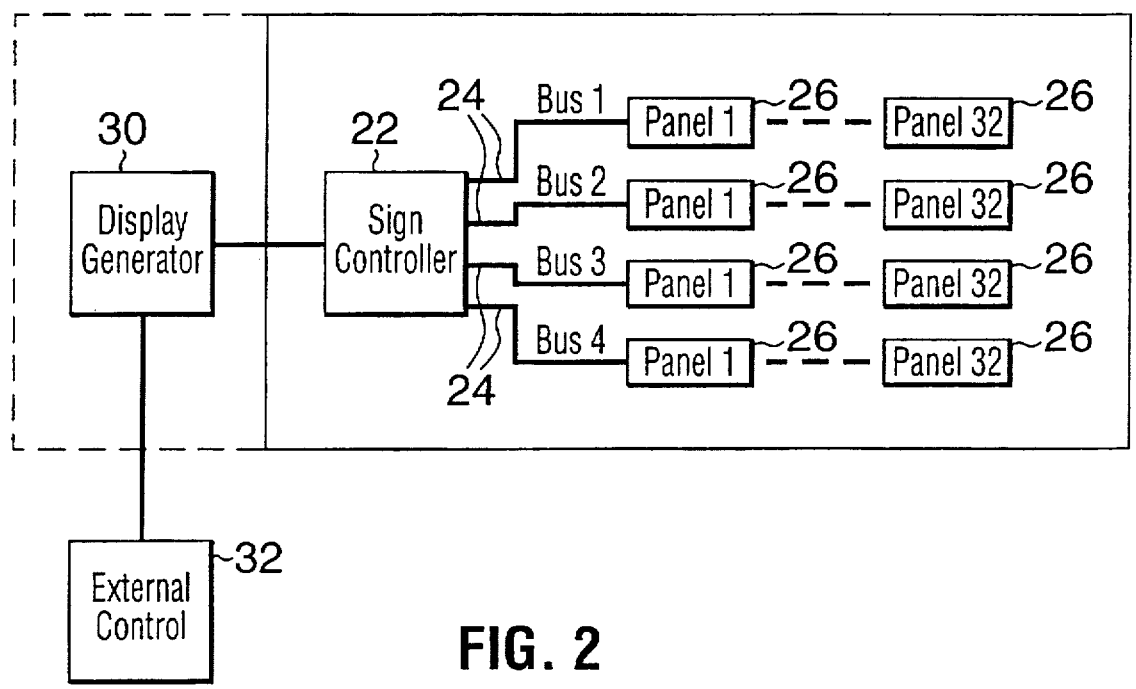
FIG. 2 is a block diagram of a preferred embodiment of an electronic display sign in accordance with the invention.

FIG. 2 shows a block diagram of the conceptual architecture of a large electronic sign in accordance with the invention. As is apparent, the sign includes a total of 128 display panels 26 connected in groups of thirty-two panels each to four sign system buses 24, as will be explained in more detail in relation to FIGS. 5 and 6. In order to facilitate flexible and convenient operation, the sign is connected to a display generator 30 which in turn includes an external control 32. In accordance with the preferred embodiment of the invention, the display generator 30 and the external control 32 comprise a personal computer equipped with software which is capable of generating a bitmap representation of the sign display. The software preferably permits the use of a bitmap editor where the user may create graphics using a mouse in a freehand style. The bitmap editor also preferably permits a user to place bitmap representations of ASCII characters at a position indicated with a mouse or pointer on a digitized pad. The software is preferably also capable of building scroll displays, creating display sequences, and receiving digitized scanner images and/or graphic files and formating such images for display in pixel form on the electronic display sign 20.

Figure 3:
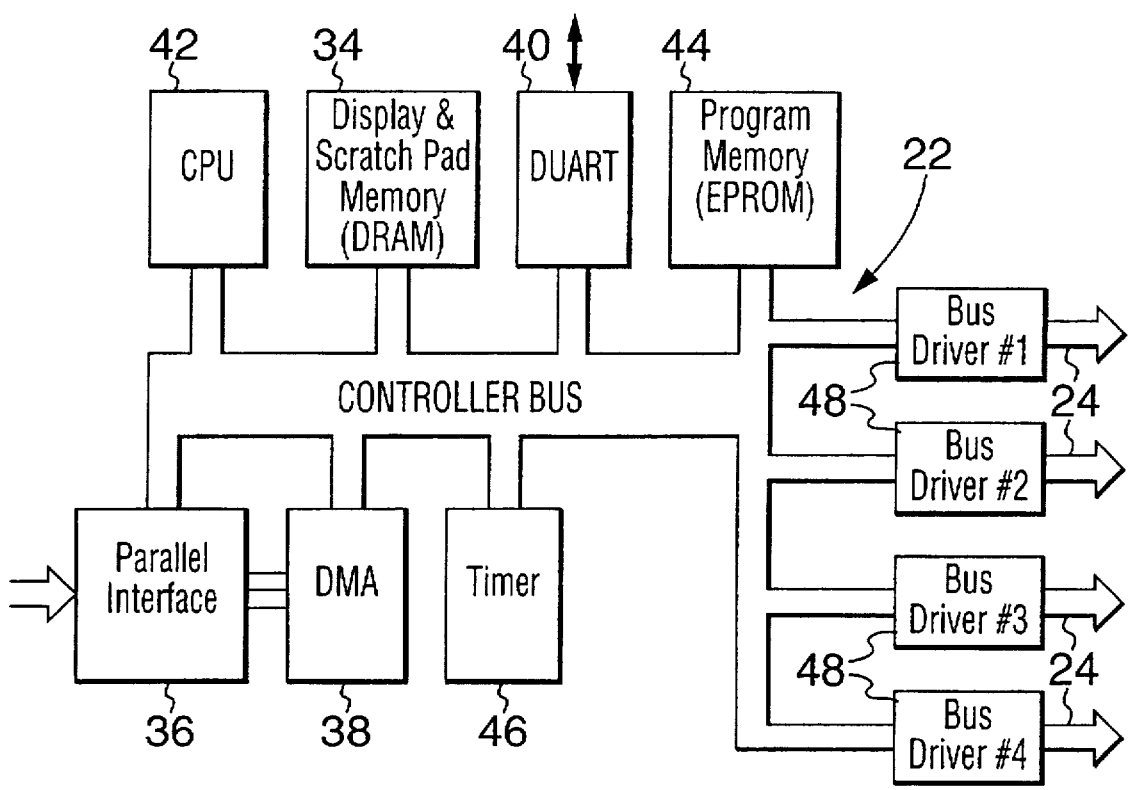
FIG. 3, which appears on the first page of the drawings, is a block diagram of a preferred embodiment of a sign controller in accordance with the invention.

FIG. 3 shows a detailed schematic diagram of the preferred embodiment of the sign controller 22. The two main functions performed by the sign controller are the acquisition of raster images from the display generator 30 and the output of the raster image data to the display panels 26 (see FIG. 2). The two processes are performed concurrently by the sign controller. Raster image data is received from the display generator 30 and is stored in a dynamic RAM buffer 34. A concurrent process reads the raster image data from the RAM memory 34 and outputs the data to the display panels 26. In order to enable animation on an electronic sign, the sign controller must output raster image data to the display panels 26 at 24 frames or more per second. A display sign 20 in accordance with the invention will output raster image data at a rate well in excess of thirty frames/sec. To meet that animation data rate the sign controller 22 (as taught herein) requires four sign system buses 24 to support a very large sign of 126 display panels. Those skilled in the art will realize that the actual number of sign system buses 24 required will depend on the speed of the bus processors. Each sign system bus 24 has a data transfer rate of 350 kbytes/sec. Each display panel 26 is connected to a sign system bus 24 and receives display data in 64 byte blocks, as will be explained below in more detail.

The preferred embodiment of the sign controller shown in FIG. 3 includes two interfaces to receive display information from an external display generator 30. The display information consists of display data, sign controller commands, and memory addressing information. The display information may be received via a parallel interface 36 which can be connected to a PC parallel centronics port to accommodate a maximum data exchange rate of about 20 kilobytes a second, assuming average load on the CPU of the PC and the sign controller. This rate will not support a real-time display data rate of thirty frames/sec. A DUART 40 is provided for asynchronous communication which permits data transfer from any RS232 source.

A dynamic memory access (DMA) controller 38 handles data movement between the communication interfaces 36, 40 and the display memory 34. The DMA controller 38 preferably operates in cycle-steal mode and uses fly-by transfers (single write cycle time). The data movement operations of the DMA controller are controlled by a sign controller central processing unit (CPU) 42. The CPU 42 may be any suitable microprocessor. An acceptable model is the Motorola MC68010P10 microprocessor but many other models are also suitable. The primary function of the CPU 42 is to output display data from the display memory to the display panels 26. As noted above, the CPU 42 must be capable of driving the largest sign configuration at a rate of about thirty frames/sec. The CPU 42 is responsible for calculating the display panel and bus driver addresses for each 64 byte image data block. The CPU 42 is also responsible for the frame timing of the images. Commands for the CPU run-time operation are placed in memory by the external controller 32. The sign controller commands include a user defined variable associated with each display image that controls the frame display rate for the image. The CPU 42 uses the variable to control the frame timing of the images. The control commands therefore determine definable frame display rate for each image.

The controller includes up to 512 kilobytes of EPROM memory 44 which is used to store the software program that controls and coordinates the activities of the sign controller. EPROM memory 44 may be further expanded to store start-up or display sequences which may be iteratively performed if communication with the display generator 30 is disabled.

A display memory 34 allocated in the dynamic RAM preferably comprises at least 8 Megabytes of addressable space although the sign may be operated with less RAM memory and therefore less display memory 34.

The sign controller 22 is also preferably provided with a timer 46 to serve as a timing source for the CPU 42. An appropriate timer is usually available as an integral part of the parallel interface 36.

Figure 5:
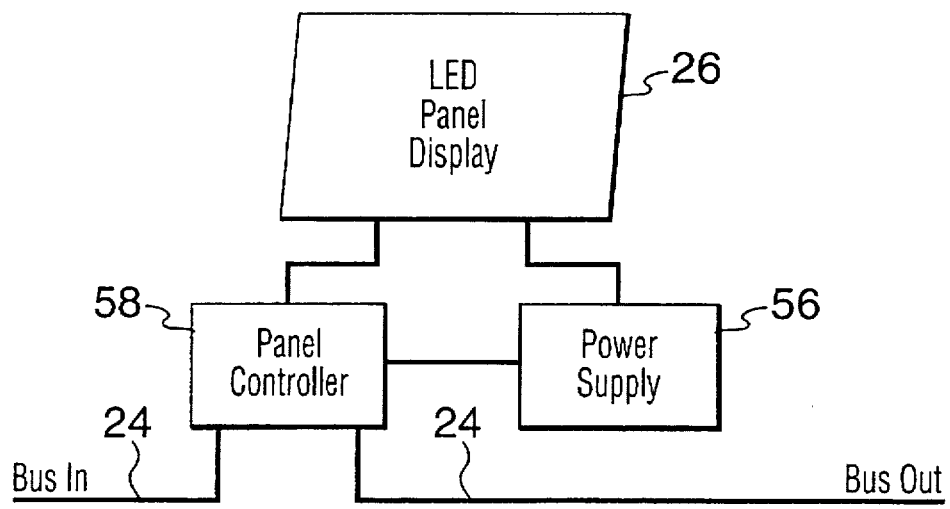
FIG. 5 is a block diagram of a display panel in accordance with the invention.
Figure 6:
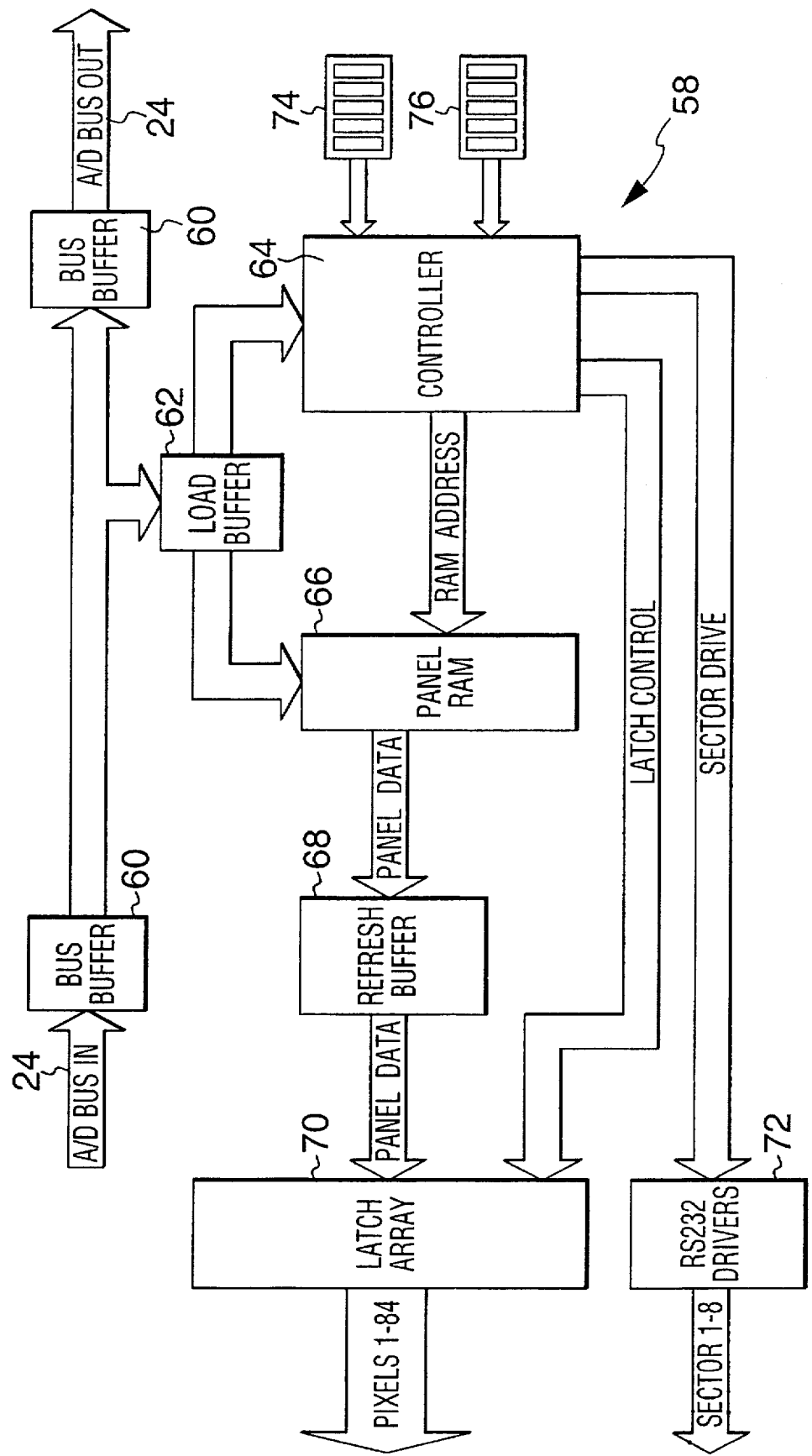
FIG. 6 is a block diagram of a display panel controller in accordance with the invention.

Finally, the sign controller 22 is preferably provided with four sign system bus drivers 48. The bus drivers 48 provide current drive capability to each sign system bus 24. The display panels 26, as will be explained in detail with reference to FIGS. 5 and 6 are daisy-chained together using standard ribbon cable. The bus signals are buffered at each display panel to keep the sign system bus driver fan out low and to compensate for any cable losses. The standard sign system bus is preferably unidirectional and includes 8 address/data bits, a data strobe, and an address strobe. All panel bus buffers are permanently enabled.

Figure 4:
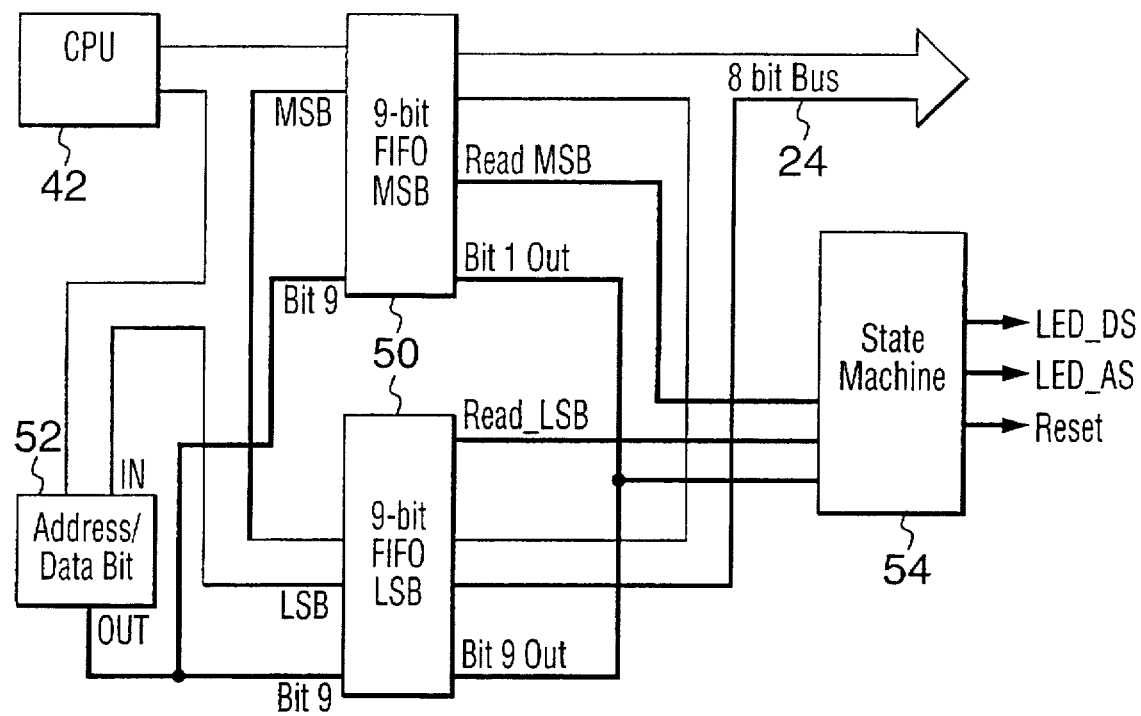
FIG. 4 is a block diagram of a preferred bus controller in accordance with the invention.

FIG. 4 shows a block diagram of a sign system bus driver 48 which is constructed with standard TTL components. The sign system bus drivers 48 have multiplexed address and data capability with address and data strobes. All four sign system bus drivers run concurrently with a maximum data transfer rate of 350 kilobytes/sec. each. The combined data transfer rate of the sign controller 22 therefore exceeds 1.2 megabytes per second. This data transfer rate permits the electronic display sign 20 to display well in excess of thirty frames/second, thereby achieving full video animation. Each sign system bus driver 48 includes a four kilobyte by 9-bit wide first-in-first-out device (FIFO) 50, an address coder 52, and a state machine 54 (field programmable gate array). A single state machine 54 preferably runs all four sign system buses 24.

The CPU 42 retrieves data from display memory 34 (see FIG. 3) and computes an address for each 64 byte block of data (the data for one display panel refresh) based on the location of that display panel 26 in the electronic display sign 20. The CPU 42 loads a byte of data into the FIFO 50 and sets the 9th FIFO bit using the address coder 52. If the data moved to FIFO 50 is an address indicating the destination of a block of display data to follow, FIFO bit 9 is set to 1 to indicate an address, otherwise, FIFO bit 9 is set to 0 to indicate a data byte. The state machine 54 is responsible for timing on the display panel bus 24. It also reads bit 9 of each FIFO byte and drives the data strobe of the standard ribbon cable high if bit 9 indicates a data byte or drives the address strobe of the standard ribbon cable high if FIFO bit 9 indicates an address byte.

FIG. 5 is a block diagram of the components of a display panel 26. Each display panel 26 is provided with a power supply 56 and a panel control card 58. The power supply 56 is preferably a high quality switching power supply capable of supplying at least 16 amps at 5 volts DC. Power supplies with less current capacity may be substituted but the cost advantages are not significant and the added reliability of a quality power supply is preferred. Since each display panel is preferably supplied with its own DC power supply, a 120 volt AC power distribution system is required for the sign. Using an efficient switching DC power supply, each display panel 26 will require between 0.8 and 1 ampere of AC current, in a worst case assuming that high intensity red LEDs are used, to power all the LEDs on the display panel. The display panel control card 58 consumes negligible power. Assuming a sign that includes one hundred twenty-eight display panels 26, the worst case current draw would be in the order of 125 amperes at 120 volts AC. An electric service for a sign must therefore be capable of supplying about one ampere per display panel.

Appropriate electrical connectors must be mounted externally of a sign for a given multiple of display panels. Ideally, each of those connectors (not illustrated) will accommodate the connection of a cable which can supply 20 amperes of AC current at 120 volts AC. A connector of this type will be required for each group of about 22 panels. A full size sign would therefore require 5 or 6 connectors of 20 amps each. Such connectors are well known in the art and widely available. Electrical power may be distributed to the panels using daisy-chain connectors for transferring power from display panel to display panel, a technique which is also well known in the art. Fuse protection (not illustrated) should be provided on each display panel 26 to prevent damage due to power surges and the like.

FIG. 6 shows a block diagram of the display panel control card 58. The display panel control card 58 is a circuit board which is physically affixed to a skeleton frame or the like on the rear of each display panel 26. Each display panel 26 preferably includes a total of 512 LEDs arranged in a grid of 16 rows by 32 columns. A multiplexing scheme in which only ⅛th of the LEDs are driven at any one time is used. This scheme reduces the number of LED drivers required. In order to avoid any reduction in lumination brightness, the LEDs are driven at a peak current of 160 mA. The ⅛ duty cycle ensures an average current of 20 mA for each LED. The multiplexing frequency operates at 1000 Hz. The actual power switching of LEDs is explained below in more detail with reference to FIG. 7.

The display panel control card 58 is responsible for accepting display data and brightness data from the sign controller via a sign system bus 24. Each display panel control card 58 has a permanently enabled bus buffer 60 to keep the sign system bus fan out low and compensate for any cable losses. Propagation delay introduced by these buffers is negligible. The panel data bus 24 is preferably unidirectional and includes 8 address/data bits, a data strobe and an address strobe, as explained above. If an address strobe is received by the bus buffer, the accompanying signal is analyzed as follows: 1) the bits 1–5 are sent to an address decoder circuit (notillustrated) which compares the address encoded in those 5 bits with the settings of the DIP switches on a panel address selector 74. If the address decoder determines a match, the subsequent 64 bytes of data transmitted on the sign system bus 24 are loaded into load buffer 62 and consequently into panel RAM memory 66. 2) The 6th and 7th bit of an address byte determine the brightness of the panel display. This permits display brightness to be adjusted with every panel refresh. 3) The 8th bit is a "broadcast bit". If the 8th bit of an address byte is set to "1", all panels load the subsequent 64 bytes of data, regardless of the actual address value in the first five bits of the address byte. This permits a very fast refresh of an entire sign. All of these operations are managed by a panel controller 64. The panel controller loads data from panel RAM 66 to a refresh buffer 68 and subsequently to a latch array 70 where sixty-four latches are set in accordance with the data.

The LEDs on each display panel 26 are divided into eight sectors, each comprising 64 pixels. The panel controller 64 generates timing signals for the eight display panel sectors and the pixels within each sector. A sector drive circuitry 72 generates a 1 kHz refresh frequency for the sectors and also controls a pulse width of a pixel drive power pulse. The pulse width of the pixel drive power pulse controls the duty cycle of the drive signal to each LED, providing the brightness control for the sign. The power pulse width is also controlled by calibration switches 76 as shall be discussed below. The RAM controller operates in two basic modes, a refresh mode and a data acquisition mode. The controller is in refresh mode unless it is acquiring data from the panel data bus 24. In refresh mode it reads data very quickly 8 bytes at a time from the display panel RAM 66. An 8 byte read is performed each time a sector drive is changed at the 1 kHz refresh rate.

When an address match is detected on the display panel bus 24, the display panel controller 64 immediately writes the next 64 bytes of data on the panel bus into the panel RAM 66 using the data strobe as its clock. This 64 byte write period requires about twenty microseconds of real time. While performing a data write cycle, the sign refresh is disabled.

As noted above, the power drive pulse width for the LEDs on the display panel 26 is controlled by the sector driver circuitry 72. Those skilled in the art are familiar with problems of steradiance matching in LED applications. It is well known that LEDs from different production batches are not always matched in brightness. When constructing an LED display sign, a manufacturer always orders enough LEDs from a single production lot to build the entire sign so that steradiance matching is not a problem. With a modular sign construction, however, steradiance matching becomes a factor because the sign may be enlarged at a later date or a given panel may fail and require replacement. In order to overcome this problem and permit steradiance matching, calibration switches 76 on the panel controller 58 permit fine tuning adjustments to the LED drive pulse width so that different production lots of LEDs can be steradiance matched to provide a sign of consistent brightness even though all the panels in the sign were not assembled using LEDs from the same production lot. This feature makes modular sign constructions practical and eliminates a major problem in prior art LED signs where replacing individual LEDs or groups of LEDs which had burned out could cause bright spots or dull spots on the sign.

Figure 7:
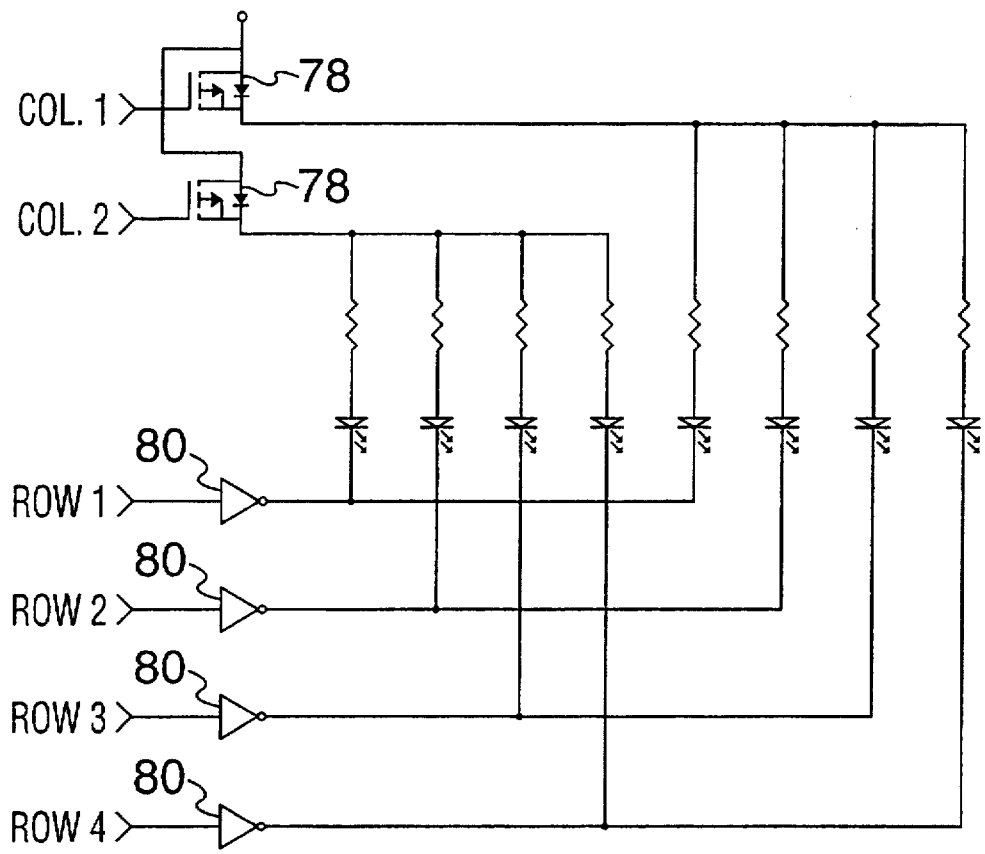
FIG. 7 is a simplified schematic of a LED power circuit for a display panel in accordance with the invention.

FIG. 7 shows a simplified schematic diagram of the circuitry of the display panel 24. In this diagram, only four rows and two columns are illustrated but the circuitry is the same for all other rows and columns. The rows are driven by P-channel power hexfet transistors. These devices have a very low on resistance, typically 0.09 ohms, and are capable of switching large amounts of current, up to 18 amperes, very rapidly. By using one P-channel hexfet 78 per 32 LEDs (the number of LEDs in each column) each power hexfet is required to switch approximately 5 amperes. Switching at this capacity, each power hexfet 78 dissipates, at most, about 2.5 watts which is well within acceptable power dissipation limitations. There are 8 row driver packages (not illustrated) which house 8 drivers each. Each of these drivers is a Darlington transistor device 80 which is capable of sinking up to 600 mA each. The transistors 80 exhibit a low collection to emitter saturation voltage of about 900 mV with only a small base current and are directly compatible with the TTL circuitry of the electronic display sign 20. The output of each transistor 80 is connected to 8 LEDs, one of which is selected during each power cycle by an appropriate column driver 78.

Figure 8:
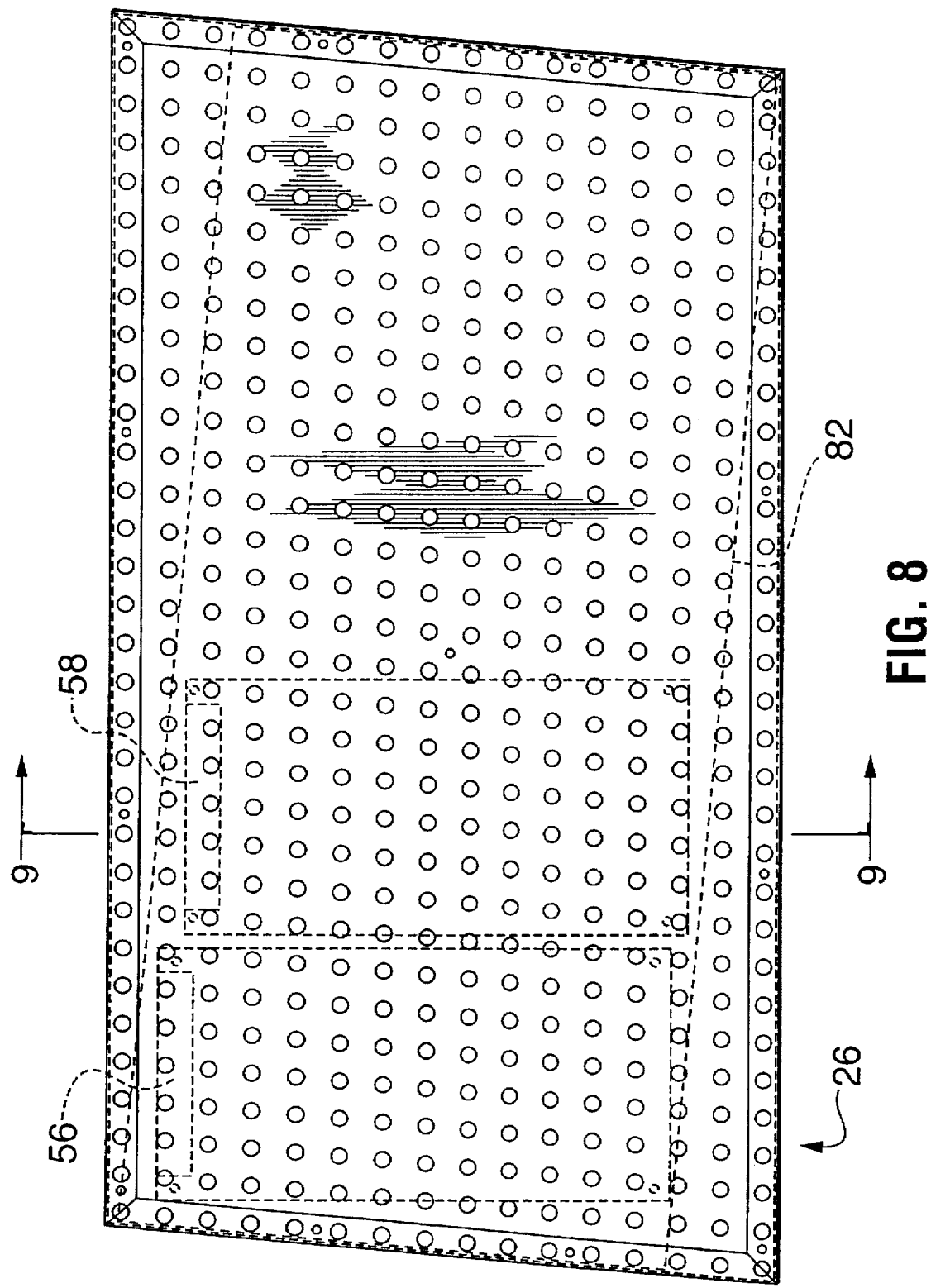
FIG. 8 is a front elevational view of a typical display panel constructed in accordance with the invention.

FIG. 8 is a front elevational view of a typical display panel 26 constructed in accordance with the invention. This particular panel is constructed with a 5° slant in order to provide a built-in italic effect for script displayed on the sign. This parallelogram-shape is, of course, optional and not a feature of the invention. Shown in phantom lines is a chassis support 82 which supports the panel control card 58 and the power supply 56. The sign controller 22 is preferably mounted to the chassis support 82 of any convenient display panel 26 in a display sign. One display panel in the sign therefore includes the sign controller 22 as well as a panel control card 58 and a power supply 56.

Figure 9:
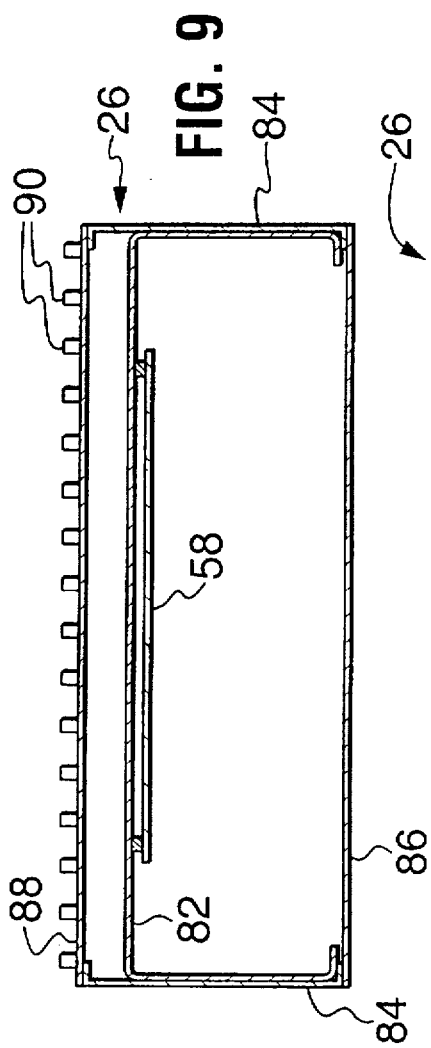
FIG. 9 is a cross-sectional view taken along lines 9—9 of the display panel shown in FIG. 8.

FIG. 9 is a cross-sectional view taken along lines 9—9 of the display panel 26 shown in FIG. 8. A typical display panel construction includes side panels 84, a rear cover 86 and a chassis support 82. The LED panel 88 is a printed circuit card which supports LEDs 90. The display panels 24 may or may not be a weatherproof construction. Weatherproofing occupies some physical space around the side panels and therefore tends to introduce gaps between panels in the LED pattern. For this reason, display panels are preferably constructed without weatherproofing so that a substantially seamless assembled sign is achieved. If the display panels are not weatherproofed, the assembled sign must be housed for outside installation. Any of a number of housings commonly available in the sign industry may be used. The front panel of the housing must, of course, be a transparent glass or the like. Alternatively, each display panel may be a weatherproof construction using techniques well known in the art.

Figure 10:
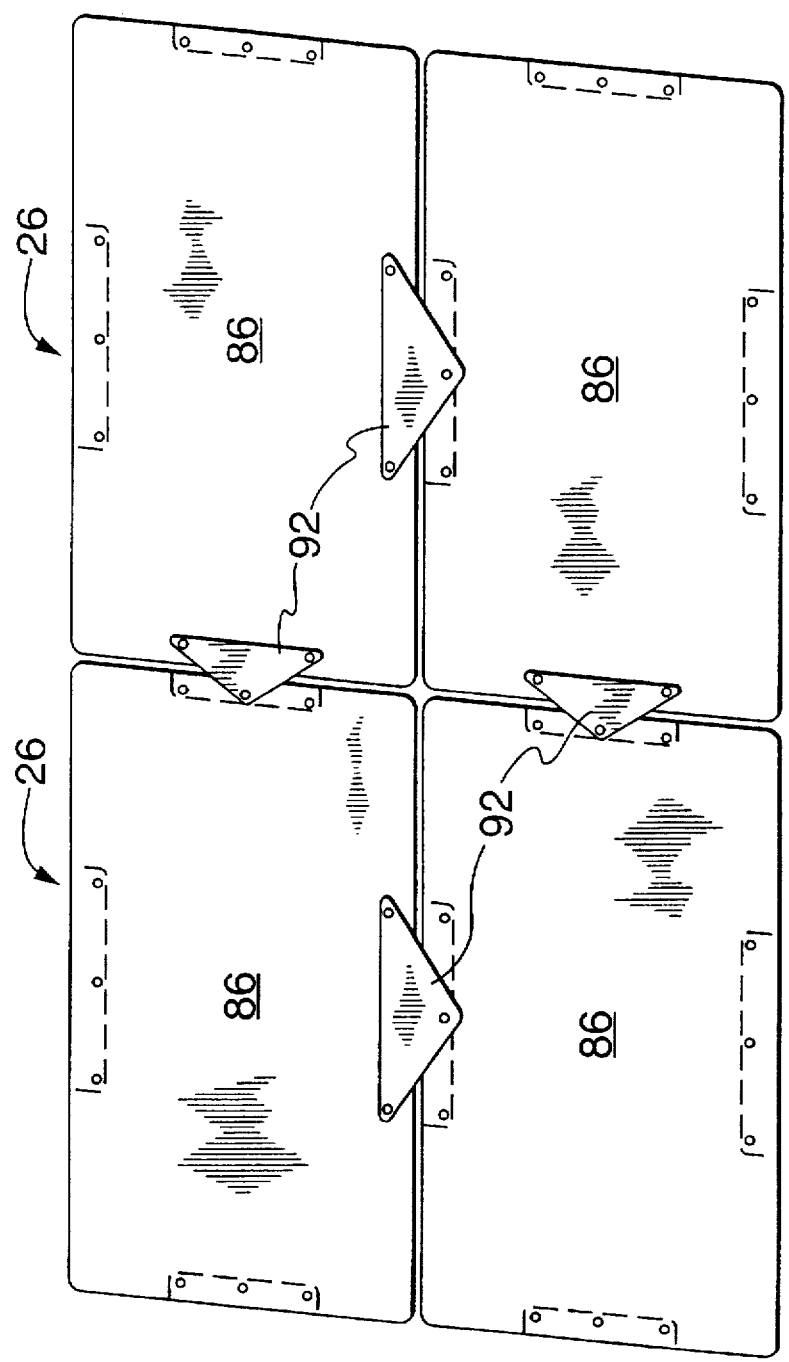
FIG. 10 is a rear elevational of four of the display panels shown in FIG. 8 connected together to form a small display sign.

FIG. 10 shows a typical arrangement for connecting panels to form a sign structure. In accordance with this arrangement, the rear covers 86 of the display panels 26 are tapped to receive screw fasteners which affix brackets 92 to retain the display panels in a stacked condition. Depending on the display panel construction, very little force is required to retain the display panels in a stacked condition. Those skilled in the art will also recognize that a number of alternate methods of interconnecting display panels is equally viable. The particular method selected will depend upon the construction of the display panel as well as the location of the finished sign. As is apparent from the above, a novel display sign architecture has been described which permits a user to select a display sign which can be enlarged without waste or undue capital investment, permits a modular approach to repairs while ensuring steradiance matching, and provides a large display sign capable of full video animation. Those skilled in the art will recognize that the novel system bus architecture of display sign control can be adapted to signs which are built using monolithic techniques.

Changes in modifications to the embodiment hereinbefore described can be made without departing from the scope of the invention which is intended to be limited solely by the scope of the appended claims.

I claim:

1. A modular electronic display sign for displaying bit-tapped image data as discrete points of light wherein the display sign includes X rows and Y columns of light sources, X and Y being integers greater than 1, arranged in at least two modular display panels of X/n rows and Y/n columns per display panel wherein n represents the number of display panels, each light source being individually controllable to display a bit-mapped image of b bits wherein b equals the X times the Y, said electronic display sign, comprising:

a sign controller which includes at least a means for receiving from an external source bit-mapped data signals representative of an image to be displayed on the display sign and control commands that determine a command definable frame display rate for the image independently of the display data and permitting display of images at different frame rates, a memory for storing the bit-mapped data and the control commands, a data transmission means for transmitting the bit-mapped data as addressed bit-mapped data, and a processor for operating the sign controller in accordance with a predefined program of instructions and the control commands that determine the command definable frame display rate for the image, at least one sign system bus connected to the data transmission means;

at least two display panels having respective display surfaces which support an array of electrically powered light sources and an electronic circuit in connection with the light sources so that any one of the light sources may be selectively powered on; and a panel control card associated with each display panel, each panel control card generating timing signals for powering on the light sources, and each panel control card being connected with a one of the at least one sign system bus and an electric power source, said panel control card being adapted to receive said addressed bit-mapped data signals from the system bus, which addressed bit-mapped data signals are representative of an image to be displayed by the light sources on the panel and to drive each light source using electric current from the power source in accordance with the signals in order to continuously display the image at a predefined refresh rate in accordance with timing signals generated by the panel control card until a new bit-mapped data signal addressed to the panel is received by the panel or a system reset signal is received by the panel.

2. The electronic display sign as claimed in claim 1 wherein the electronic circuit for selectively powering on the light sources on the display panel consists exclusively of a latch array and a sector drive circuit.

3. The electronic display sign as claimed in claim 2 wherein the light sources on the display surface comprise light emitting diodes.

4. The electronic display sign as claimed in claim 3 wherein the display surface supports 512 light emitting diodes.

5. The electronic display sign as claimed in claim 4 wherein the latch array includes 64 latches and the sector drive circuit includes 8 sector drivers.

6. The electronic display sign as claimed in claim 1 wherein the sign system bus is a standard ribbon cable bus.

7. The electronic display sign as claimed in claim 6 wherein the sign system bus includes eight data conductors, a data strobe conductor and an address strobe conductor.

8. An electronic display sign as claimed in claim 2 wherein the panel control card further includes DIP switches for selecting an address for the display panel.

9. An electronic display sign as claimed in claim 8 wherein the control card includes five DIP switches for selecting a five bit address for the control card.

10. An electronic display sign as claimed in claim 2 wherein the panel control card further includes DIP switches for fine tuning the power pulse width of the drive signal for the light sources so that the pulse width of the drive signals for the light sources may be used to match the steradiance of two or more panels respectively constructed with light emitting diodes from different production batches.

11. An electronic display sign as claimed in claim 1 wherein the data transmission means comprises a sign system bus driver circuit which includes an address coder, a first-in-first-out device and a state machine.

12. The electronic display sign as claimed in claim 11 wherein the first-in-first-out device is 9 bits wide and the processor uses the address coder to set a 9th bit in the first-in-first-out device to 1 if a byte loaded by the processor to the first-in-first-out device is an address byte and to 0 if the byte is a data byte.

13. The electronic display sign as claimed in claim 12 wherein the sign system bus is a standard ribbon cable having a capacity for at least eight data conductors, a data strobe conductor and an address strobe conductor.

14. The electronic display sign as claimed in claim 13 wherein the state machine drives the data strobe conductor high if the 9th bit of the first-in-first-out device is set to zero and drives the address strobe conductor high if said 9th bit is set to one.

15. The electronic display sign as claimed in claim 1 wherein the panel control card comprises a bus buffer connected to a one of the at least one sign system bus, a memory for storing the data signals received from the sign system bus and a controller for driving a latch array and at least one sector driver with current from the power source to power on the light sources in accordance with the data signals.

16. The electronic display sign as claimed in claim 15 wherein the controller operates in one of a data acquisition mode and a display refresh mode, the sign normally operates in the display refresh mode, and the display refresh mode is disabled when the sign is in the data acquisition mode.

17. A modular electronic display sign for displaying bit-mapped image data as discrete points of light wherein the display sign includes X rows and Y columns of light sources, X and Y being integers greater than 1, arranged in at least two modular display panels of X/n rows and Y/n columns per display panel wherein n represents a number of modular units, each light source being individually controllable to display a bit-mapped image of b bits wherein b equals the X times the Y, said modular display sign comprising:
- a sign controller which includes at least one means for receiving from an external source bit-mapped data signals representative of images to be displayed on the display sign and control commands that determine a command definable frame display rate for the image independently of the display data and permitting display of images at different frame rates, a memory for storing the bit-mapped data signals and the control commands, at least one sign system bus driver, and a processor for operating the sign controller in accordance with a pre-defined program of instructions and the control commands command definable frame display rate for the image;
- a sign system bus connected to each of the at least one sign system bus driver;
- at least one display panel connected to each sign system bus, the at least one display panel having a display surface which supports an array of electrically powered light sources and an electronic circuit in connection with the light sources so that any one of the light sources can be selectively powered on;
- a panel control card associated with each display panel, the panel control card including a sign system bus buffer connected to the sign system bus, a memory, and a controller for generating timing signals, the panel control card further including means for assigning an address to the panel control card, and the controller operating to store in the memory data transferred by the sign controller on the sign system bus and addressed to the panel control card, and the controller further operating the electronic circuit and a power source to selectively power on the light sources in accordance with the data in a continuous refresh cycle in accordance with the timing signals generated by the controller whenever new data is not being received and the panel control card has not received a system reset signal.

18. The modular electronic display sign as claimed in claim 17 wherein the power source is a power supply associated with each display panel.

19. The modular electronic display sign as claimed in claim 18 wherein the array of light sources comprise light emitting diodes arranged in a matrix pattern and the electronic circuit comprises an XY grid.

20. A display panel for an electronic display sign of the type wherein a plurality of the display panels are juxtaposed to provide an integrated display surface which supports a plurality of discrete light sources which may be selectively powered on for displaying an image as points of light, said display panel comprising:
- a display surface for supporting an array of light sources and an electronic circuit connected to the light sources so that the light sources can be selectively powered on;
- a frame connected to the display surface;
- a display panel control card connected to the frame, the display panel control card including a sign system bus buffer for connection with a sign system bus, a memory, a drive signal circuit for generating a drive signal to selectively power on the light sources, and a controller to operate the sign system bus buffer, the memory and the drive signal circuit in accordance with a pre-defined program of instructions;

whereby the predefined program of instructions is adapted to operate the display panel to receive from the system bus a block of addressed, bit-mapped display data arranged as consecutive contiguous bytes, which block of addressed bit-mapped display data represents an on/off condition for each of the light sources on the panel, and to drive each light source using electric current from the power source in accordance with the display data in order to continuously display at a predefined refresh rate an image represented by the display data in accordance with timing signals generated by the panel control card until a new block of bit-mapped display data addressed to the panel is received by the panel control card or a system reset signal is received by the panel control card.

21. An electronic display sign comprising:
- at least one display panel having a display surface which supports a plurality of discrete electrically powered light sources and an electronic circuit in connection with the light sources so that each of the light sources may be selectively powered on, the display panel including a power source and a display panel controller for generating timing signals for powering on the light sources;
- a sign controller for generating data signals representative of a pattern for selectively powering on the light sources and control signals for determining an intensity of illumination of the light sources, the sign controller including at least one interface for receiving display data for generating the data signals and control commands that determine a command definable frame display rate for the pattern independently of the display data and permitting display of images at different frame rates; and
- a sign system bus in electrical connection with the sign controller and the display panel controller of the at least one display panel, the sign system bus communicating the data signals and the control signals from the sign controller to the at least one display panel controller to effect illumination of the light sources in accordance with the pattern and specified intensity of illumination, a refresh rate of the illumination of the light sources being controlled in accordance with the timing signals generated by the display panel controller.

22. An electronic display sign as claimed in claim 21 wherein the display panel comprises a modular unit adapted to be juxtaposed with other display panels to form a display sign having a continuous planar display surface.

23. The electronic display sign as claimed in claim 22 wherein the display panel comprises a rectangular display surface, a supporting frame affixed to the display surface, and a power supply and a display panel control card affixed to the supporting frame.

24. The electronic display sign as claimed in claim 23 wherein the display panel control card includes a panel controller, a sign system bus buffer, a memory, and an electronic circuit for selectively driving the light sources on the display panel.

25. The electronic display sign as claimed in claim 24 wherein the electronic circuit for selectively powering on the light sources on the display panel consists exclusively of a latch array and a sector drive circuit.

26. The electronic display sign as claimed in claim 24 wherein the light sources on the display surface comprise light emitting diodes.

27. The electronic display sign as claimed in claim 26 wherein the display surface supports 512 light emitting diodes.

28. The electronic display sign as claimed in claim 27 wherein the latch array includes 64 latches and the sector drive circuit includes 8 sector drivers.

29. The electronic display sign as claimed in claim 21 wherein the sign system bus is a standard ribbon cable bus.

30. The electronic display sign as claimed in claim 29 wherein the sign system bus includes 8 data conductors, a data strobe conductor and an address strobe conductor.

* * * * *

UNITED STATES PATENT AND TRADEMARK OFFICE
CERTIFICATE OF CORRECTION

PATENT NO. : 5,796,376
DATED : August 18, 1998
INVENTOR(S) : ARCHIE A. BANKS It is certified that error appears in the above-identified patent and that said Letters Patent is hereby corrected as shown below:

Claim 1, column 9, line 21, delete "tapped" and substitute therefor -- mapped --.

Signed and Sealed this

Sixteenth Day of November, 1999

Attest:

Q. TODD DICKINSON

*Attesting Officer*  *Acting Commissioner of Patents and Trademarks*